(12) United States Patent
Fargo et al.

(10) Patent No.: US 9,630,805 B2
(45) Date of Patent: Apr. 25, 2017

(54) NON-LINEAR STIFFNESS ROLLER ASSEMBLY

(75) Inventors: Richard N. Fargo, Plainville, CT (US); Brad Guilani, Woodstock Valley, CT (US); James L. Hubbard, Kensington, CT (US); Adrian D. West, New Britain, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 99 days.

(21) Appl. No.: 14/112,423

(22) PCT Filed: May 27, 2011

(86) PCT No.: PCT/US2011/038374
§ 371 (c)(1),
(2), (4) Date: Oct. 17, 2013

(87) PCT Pub. No.: WO2012/166097
PCT Pub. Date: Dec. 6, 2012

(65) Prior Publication Data
US 2014/0069746 A1   Mar. 13, 2014

(51) Int. Cl.
*B66B 7/04* (2006.01)
*F16C 13/00* (2006.01)
*B66B 7/02* (2006.01)

(52) U.S. Cl.
CPC ............. *B66B 7/046* (2013.01); *B66B 7/022* (2013.01); *F16C 13/00* (2013.01)

(58) Field of Classification Search
CPC . F16C 13/00; B66B 7/04; B66B 7/046; B66B 7/041; B66B 7/048; B66B 7/022
(Continued)

(56) References Cited

U.S. PATENT DOCUMENTS 2,498,299 A * 2/1950 Rissler .................... B66B 7/046
                                                187/406
3,099,334 A * 7/1963 Tucker, Jr. .............. B66B 7/046
                                                187/406
(Continued)

FOREIGN PATENT DOCUMENTS

JP  51-023954 U   2/1976
JP  58-154273 U  10/1983
(Continued)

OTHER PUBLICATIONS

International Search Report and Written Opinion for Corresponding International Application No. PCT/US2011/038374 filed May 27, 2011. Report Dated Feb. 17, 2012.
(Continued)

*Primary Examiner* — William E Dondero
*Assistant Examiner* — Diem Tran
(74) *Attorney, Agent, or Firm* — Cantor Colburn LLP

(57) ABSTRACT

A roller apparatus is provided. The roller apparatus may include a bearing wheel configured to rotatably couple the roller apparatus to a roller shaft, and a resilient member radially disposed about the bearing wheel and configured to contact a guiderail at different magnitudes of loads. The resilient member may include a first section of a first diameter and a second section of a second diameter. The first section may be caused to deflect in response to loads within a first load range, while the second section may be caused to deflect in response to loads within a second load range. The resilient member may exhibit a stepwise increase in stiffness with a gradual increase in load.

18 Claims, 7 Drawing Sheets

(58) Field of Classification Search
USPC .......................................................... 187/410
See application file for complete search history.

(56) References Cited

U.S. PATENT DOCUMENTS

| | | | | |
|---|---|---|---|---|
| 3,669,222 | A | * | 6/1972 | Takamura ................ B66B 7/048 187/406 |
| 3,856,117 | A | * | 12/1974 | Solymos ................. B66B 7/046 187/406 |
| 5,033,589 | A | * | 7/1991 | Rhodes ................... B66B 7/046 187/410 |
| 6,062,347 | A | | 5/2000 | Traktovenko |
| 6,345,698 | B1 | | 2/2002 | Ravishankar |
| 2007/0000732 | A1 | | 1/2007 | Kulak et al. |
| 2010/0089707 | A1 | | 4/2010 | Qiu |

FOREIGN PATENT DOCUMENTS

| | | |
|---|---|---|
| JP | S58 154273 U | 10/1983 |
| JP | 08-245119 A | 9/1996 |
| JP | H09 77415 A | 3/1997 |
| JP | 2003 301883 A | 10/2003 |
| JP | 2003-301883 A | 10/2003 |
| JP | 2007-521204 A | 8/2007 |
| WO | WO 2005/044710 A1 | 5/2005 |
| WO | WO 2008/079146 A1 | 7/2008 |
| WO | WO 2013170532 A1 * | 11/2013 ............. B66B 7/046 |

OTHER PUBLICATIONS

Office Action issued in corresponding Japanese Patent Application No. 2014-512811; Action dated Nov. 7, 2014.

* cited by examiner

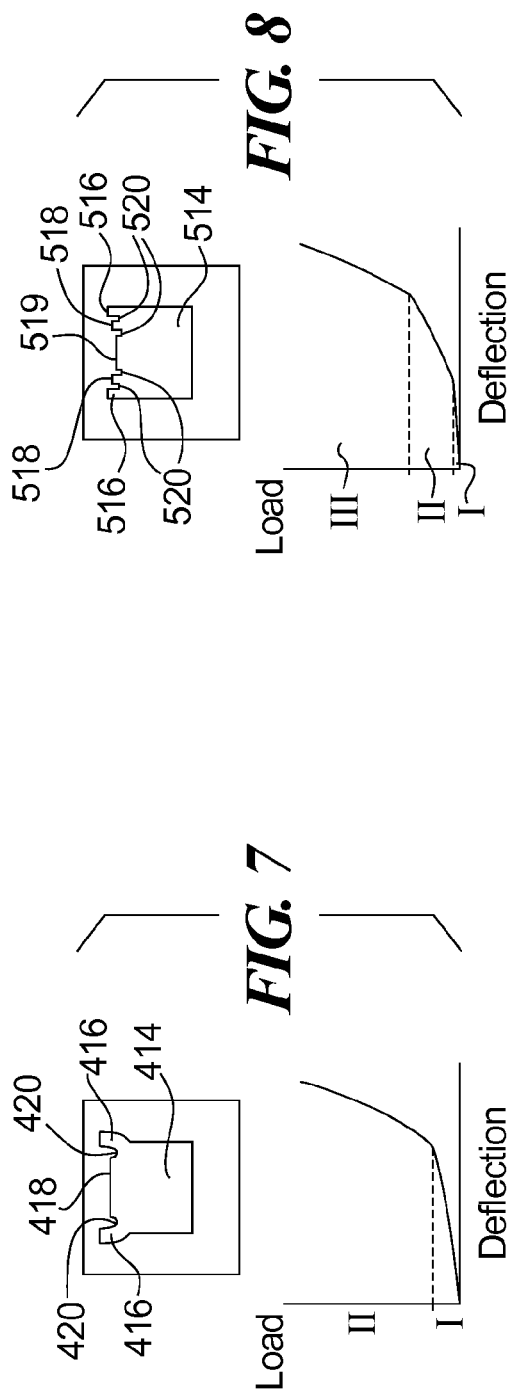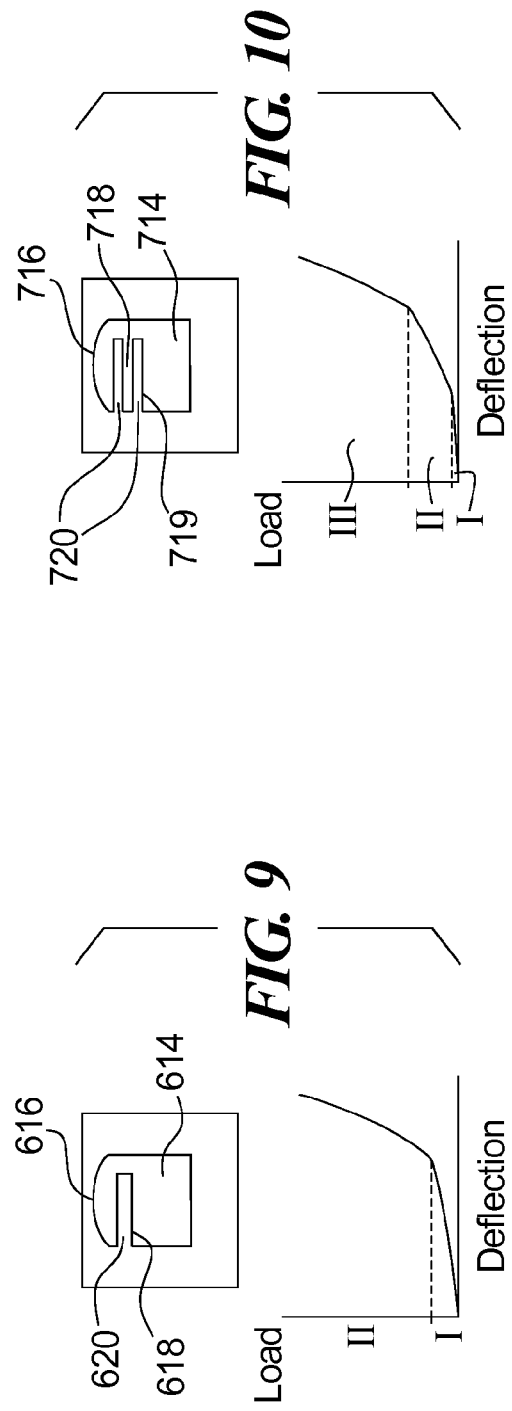

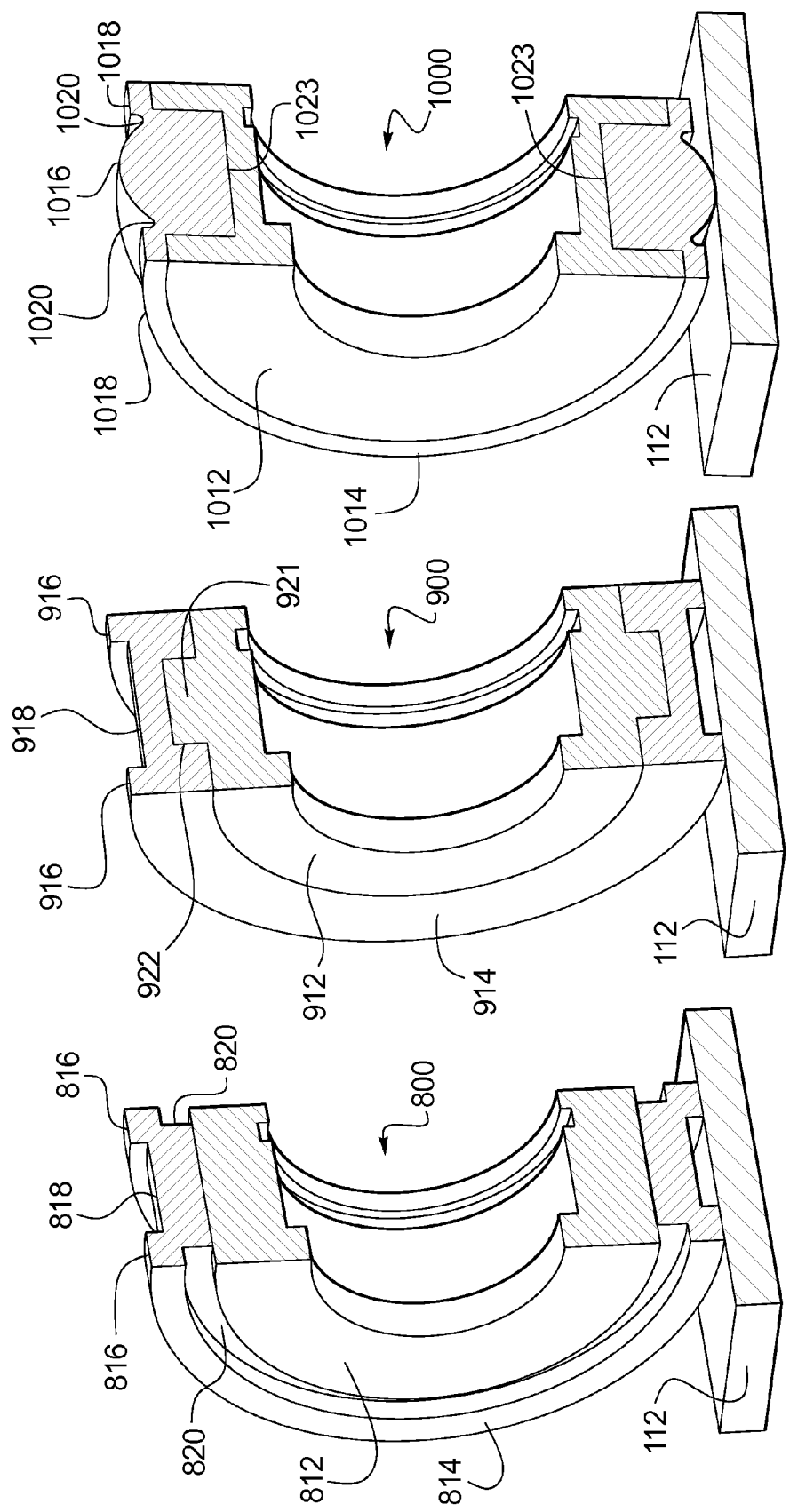

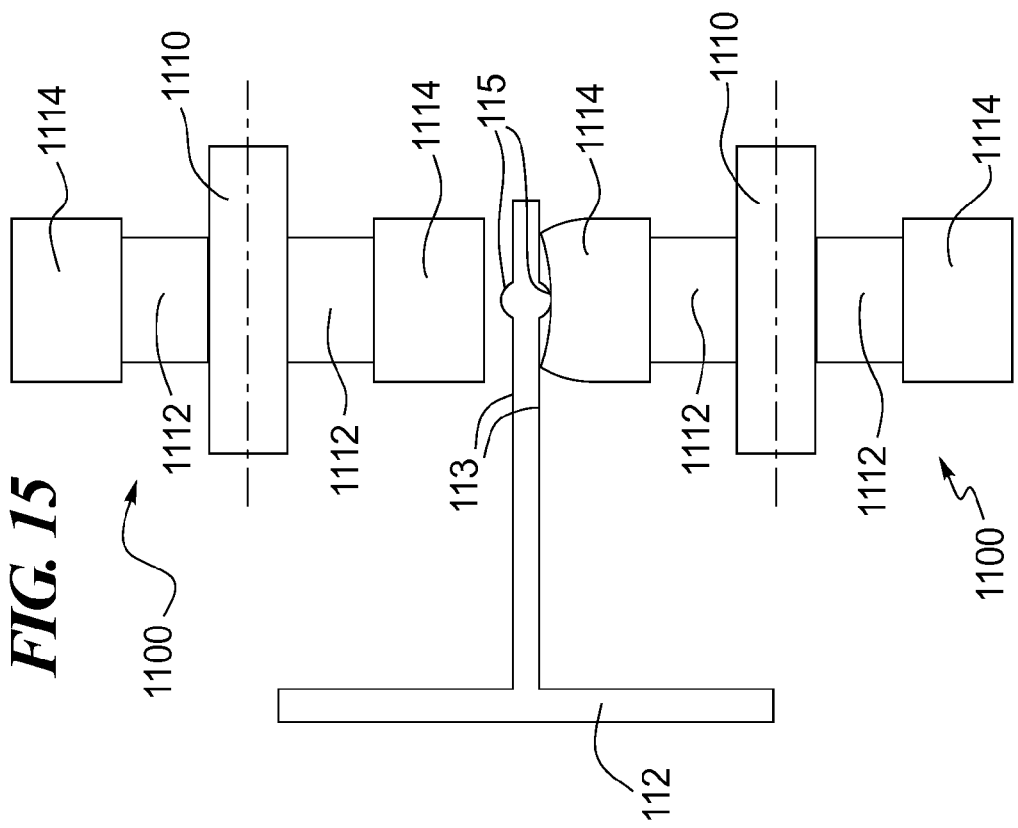
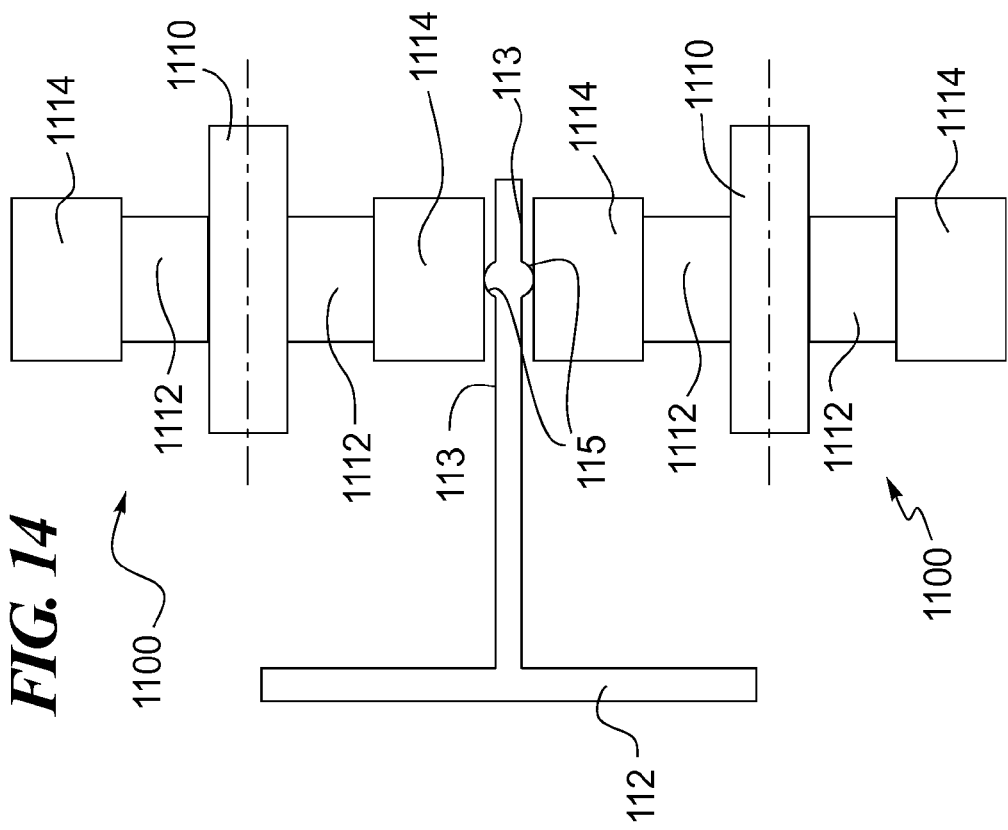

US 9,630,805 B2

NON-LINEAR STIFFNESS ROLLER ASSEMBLY

CROSS-REFERENCE TO RELATED APPLICATIONS

This application is a U.S. national stage filing under 35 USC §371 of International Patent Application No. PCT/US2011/038374, filed on May 27, 2011.

FIELD OF THE DISCLOSURE

The present disclosure generally relates to elevator systems, and more particularly, to roller and guiderail assemblies for elevators.

BACKGROUND OF THE DISCLOSURE

A typical elevator system comprises an elevator car and a counterweight, each suspended on opposite ends of hoist ropes, belts, cables, or the like, and movably disposed within an elevator hoistway. Elevator systems further include a set of guiderails generally extending the length of the hoistway and disposed on opposing sides of the hoistway to evenly guide the elevator car therethrough. Roller guide assemblies rigidly coupled to the elevator car are configured with rollers which roll along the guiderails as the elevator car travels through the hoistway. Because of their direct interaction with the guiderails, the design of the roller guide assemblies and the associated rollers may be the most influential variable in improving the ride quality of elevators.

Various factors may affect the ride quality as experienced by passengers of an elevator car as it travels through an elevator hoistway. Among other things, elevator cars may be subjected to lateral vibrations or relatively low offset loads as the rollers of the roller guide assembly move over any unevenness or imperfections in the guiderails. Elevator cars may also be subjected to higher offset loads caused by, for example, any significant movement of passengers within the elevator car, the loading or unloading of passengers, or the like. Currently existing elevator systems employ different roller guide configurations, such as suspension mechanisms and/or elastomeric roller materials, to provide adequate stiffness and to dampen the offset loads which cause ride discomfort. While such roller guide mechanisms may provide adequate stiffness and dampening, there is still room for improvement.

Some elevator systems employ roller guide assemblies having suspension mechanisms which support the rollers on movable roller axes. In particular, the suspension flexibly biases the rollers against the associated guiderail such that any vibrations caused by imperfections in the guiderails or lower offset loads are sufficiently dampened by the suspension before reaching the elevator car. While suspension-based assemblies may adequately dampen lower offset loads, these roller guide assemblies do not provide adequate stiffness for higher offset loads. Rather, suspension-based assemblies provide safeties or stops which limit further travel of the suspension and prevent undesirable contact between the roller guide assemblies and the respective guiderails. Due to the complexity and the number of components involved, suspension-based roller guide assemblies tend to be more costly to implement and maintain.

Other types of elevator systems employ roller guide assemblies with rollers having fixed roller axes. Fixed-axis rollers are typically provided with an elastomeric material having a generally tapered or rounded surface which serves to cushion contact between the rollers and the guiderails. In contrast to suspension-based assemblies, the tapered or rounded area of contact as shown in FIG. 1 provides a nonlinear increase in stiffness as the elastomeric material deforms under load and conforms to the flat surfaces of the guiderails, also known as Hertz contact. While a Hertz contact roller may be a less costly solution which also provides nonlinearly increasing stiffness in response to offset loads, a Hertz contact roller still lacks the ability to provide a sufficiently sharp transition in stiffness at desired deflection points. Moreover, there is a very limited range within which the stiffness exhibited by the roller may be adjusted to meet dampening criteria for different system configurations. Furthermore, the stiffness of such fixed-roller guide assemblies are highly dependent upon the material properties of the elastomer. For instance, the stiffness of the elastomeric materials of Hertz contact rollers may vary considerably with changes in ambient temperature.

SUMMARY OF THE DISCLOSURE

In accordance with one embodiment of the disclosure, a roller apparatus is provided. The roller apparatus may include a bearing wheel configured to rotatably couple the roller apparatus to a roller shaft, and a resilient member radially disposed about the bearing wheel and configured to contact a guiderail at different magnitudes of loads. The resilient member may include a first section of a first diameter and a second section of a second diameter. The first section may be caused to deflect in response to loads within a first load range, while the second section may be caused to deflect in response to loads within a second load range. The resilient member may exhibit a stepwise increase in stiffness with a gradual increase in load.

In a further embodiment of the foregoing roller apparatus, each of the first and second sections of the resilient member may be formed of a single resilient material.

In a refinement of either of the foregoing roller apparatus embodiments, the first diameter may be greater than the second diameter and the second load range may be greater in magnitude than the first load range. The stepwise increase in stiffness may occur when the load exceeds the first load range.

In a refinement of any of the foregoing roller apparatus embodiments, the stepwise increase in stiffness may occur when the first section deflects and the second section makes contact with the guiderail.

In a refinement of any of the foregoing roller apparatus embodiments, the first section may include two or more radially extended surfaces and the second section may be disposed therebetween.

In a refinement of any of the foregoing roller apparatus embodiments, the resilient member may include at least one groove distinguishing the first section from the second section. The groove may be configured to reduce the stiffness of at least one of the first and second sections.

In a refinement of any of the foregoing roller apparatus embodiments, the groove may be disposed at a side of the resilient member such that the first section is radially distinguished from the second section. The stepwise increase in stiffness may occur when the load exceeds the first load range and causes the groove to be substantially closed.

In a refinement of any of the foregoing roller apparatus embodiments, the resilient member may further include a third section of a third diameter being caused to deflect in response to loads within a third load range. The third diameter may be less than each of the first and second diameters, and the third load range may be greater in magnitude than each of the first and second load ranges.

In accordance with another embodiment of the disclosure, a guide assembly is provided. The guide assembly may include a baseplate having a plurality of roller shafts rigidly coupled thereto, and a plurality of rollers rotatably coupled to the roller shafts. Each roller may include a resilient member being configured to contact a guiderail at different magnitudes of loads, and having a first section of a first diameter and a second section of a second diameter. The resilient member may exhibit a stepwise increase in stiffness with a gradual increase in load.

In a further embodiment of the guide assembly, the first section may be caused to deflect in response to loads within a first load range and the second section may be caused to deflect in response to loads within a second load range. The first diameter may be greater than the second diameter and the second load range may be greater in magnitude than the first load range.

In a refinement of any of the foregoing guide assembly embodiments, each of the first and second sections of the resilient member may be formed of a single resilient material.

In a refinement of any of the foregoing guide assembly embodiments, the first section may include two or more radially extended surfaces and the second section may be disposed therebetween.

In a refinement of any of the foregoing guide assembly embodiments, the resilient member may include at least one groove distinguishing the first section from the second section. The groove may be configured to reduce the stiffness of at least one of the first and second sections.

In a refinement of any of the foregoing guide assembly embodiments, the plurality of rollers may include a first roller, a second roller and a third roller. The first and second rollers may be aligned with one another at an edge of the baseplate so as to receive, in a rolling manner, opposing surfaces of the guiderail therebetween. The third roller may be orthogonally positioned between the first and second rollers so as to receive, in a rolling manner, an edge of the guiderail thereagainst.

In a refinement of any of the foregoing guide assembly embodiments, the resilient member of the third roller may include at least one groove disposed at a side thereof such that the first section is radially distinguished from the second section.

In accordance with yet another embodiment of the disclosure, an elevator system is provided. The elevator system may include two or more guiderails vertically disposed within a hoistway, an elevator car movably disposed between the guiderails, and a plurality of guide assemblies disposed between the elevator car and the guiderails. Each guide assembly may include a baseplate rigidly coupled to the elevator car, and a plurality of rollers rotatably coupled to the baseplate. Each roller may include a resilient member being configured to contact the guiderails at different magnitudes of loads and exhibit a stepwise increase in stiffness with a gradual increase in load.

In a further embodiment of the foregoing elevator system, each guiderail may include at least one flat surface and at least one protruded surface substantially extending the length of the guiderail and configured to interface with at least one of the resilient members. The resilient members may be configured to exhibit a first stiffness in response to loads within a first load range while contacting the protruded surface and exhibit a second stiffness in response to loads within a second load range while contacting both the flat surface and the protruded surface. The second load range may be greater in magnitude than the first load range.

In a refinement of any of the foregoing elevator system embodiments, the resilient member may include a first section of a first diameter being caused to deflect in response to loads within a first load range, and a second section of a second diameter being caused to deflect in response to loads within a second load range. The first diameter may be greater than the second diameter and the second load range may be greater in magnitude than the first load range.

In a refinement of any of the foregoing elevator system embodiments, the plurality of rollers may include at least two front-to-back rollers aligned with one another at an edge of the baseplate so as to receive, in a rolling manner, opposing surfaces of the guiderail therebetween and limit front-to-back movement of the elevator car.

In a refinement of any of the foregoing elevator system embodiments, the plurality of rollers may include at least one side-to-side roller orthogonally positioned between the front-to-back rollers so as to receive, in a rolling manner, an edge of the guiderail thereagainst and limit side-to-side movement of the elevator car.

These and other aspects of this disclosure will become more readily apparent upon reading the following detailed description when taken in conjunction with the accompanying drawings.

BRIEF DESCRIPTION OF THE DRAWINGS

FIGS. 7-10 illustrate partial cross-sectional views of additional roller embodiments and graphical views of the deflective properties thereof;

FIGS. 11-13 illustrate partial perspective views of still further alternative roller embodiments; and FIGS. 14-15 illustrate cross-sectional views of yet another roller embodiment as applied to guiderails with modified surfaces.

Figure 1:
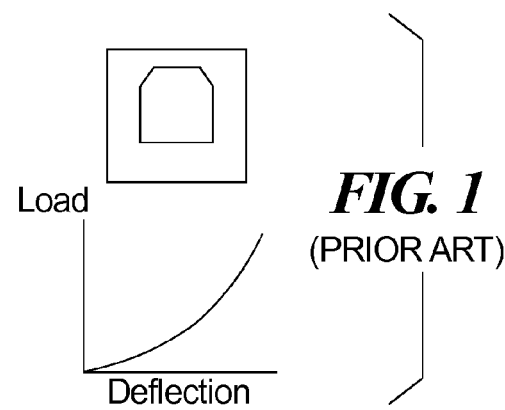
FIG. 1 illustrates a partial cross-sectional view of a prior art roller apparatus and a graphical view of the deflective properties thereof.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling within the scope of the present disclosure.

DETAILED DESCRIPTION

Figure 2:
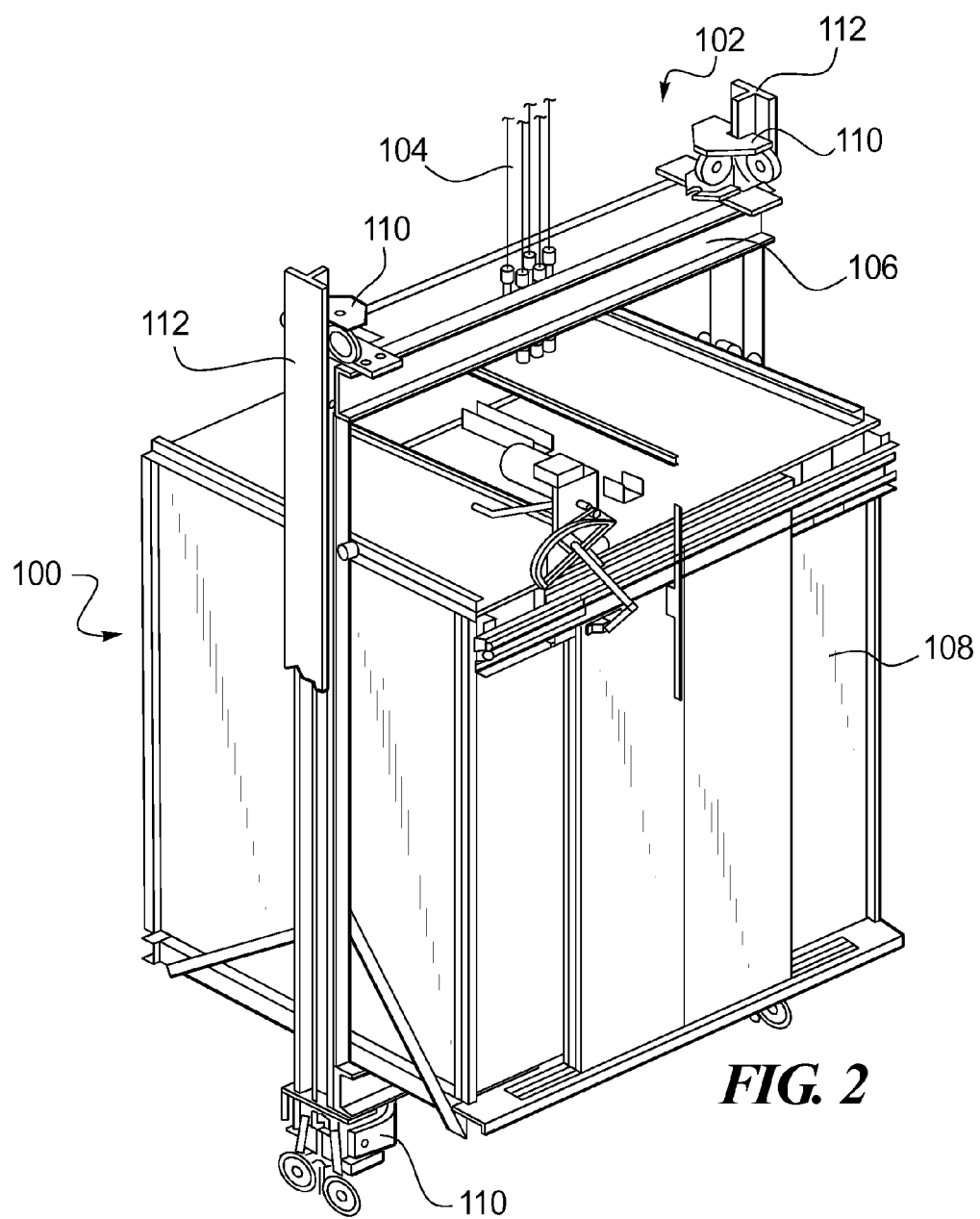
FIG. 2 illustrates a perspective view of one exemplary elevator system.

Referring now to FIG. 2, a diagram of an exemplary elevator system 100 is provided. It is to be understood that the version of the elevator system 100 shown in FIG. 2 is for illustrative purposes only and to present background for some of the various components of a general elevator system. Other components of an elevator system unnecessary for an understanding of the present disclosure are not described.

As shown in FIG. 2, an elevator system 100 may be disposed within a hoistway 102 and provided with traction members 104, an elevator car frame 106, an elevator car 108, roller guide assemblies 110 and guiderails 112. More specifically, the traction members 104 may, as shown, be cables secured between the car frame 106 and a counterweight (not shown) movably mounted within the hoistway 102. In all elevator system embodiments herein, however, the traction members may include belts, or other suspension means.

Similarly, although the car 108 and car frame 106 are shown as being separate, but joined, entities, in all elevator system embodiments herein, the car and car frame may be an integral structure. The car 108 may be coupled to the car frame 106 and configured to travel up and down the hoistway 102 by forces transmitted through the cables 104 to the car frame 106. The roller guides 110 may be attached to the car frame 106 and configured to vertically guide the elevator car 108 through the hoistway 102 along the guiderails 112.

Figure 3:
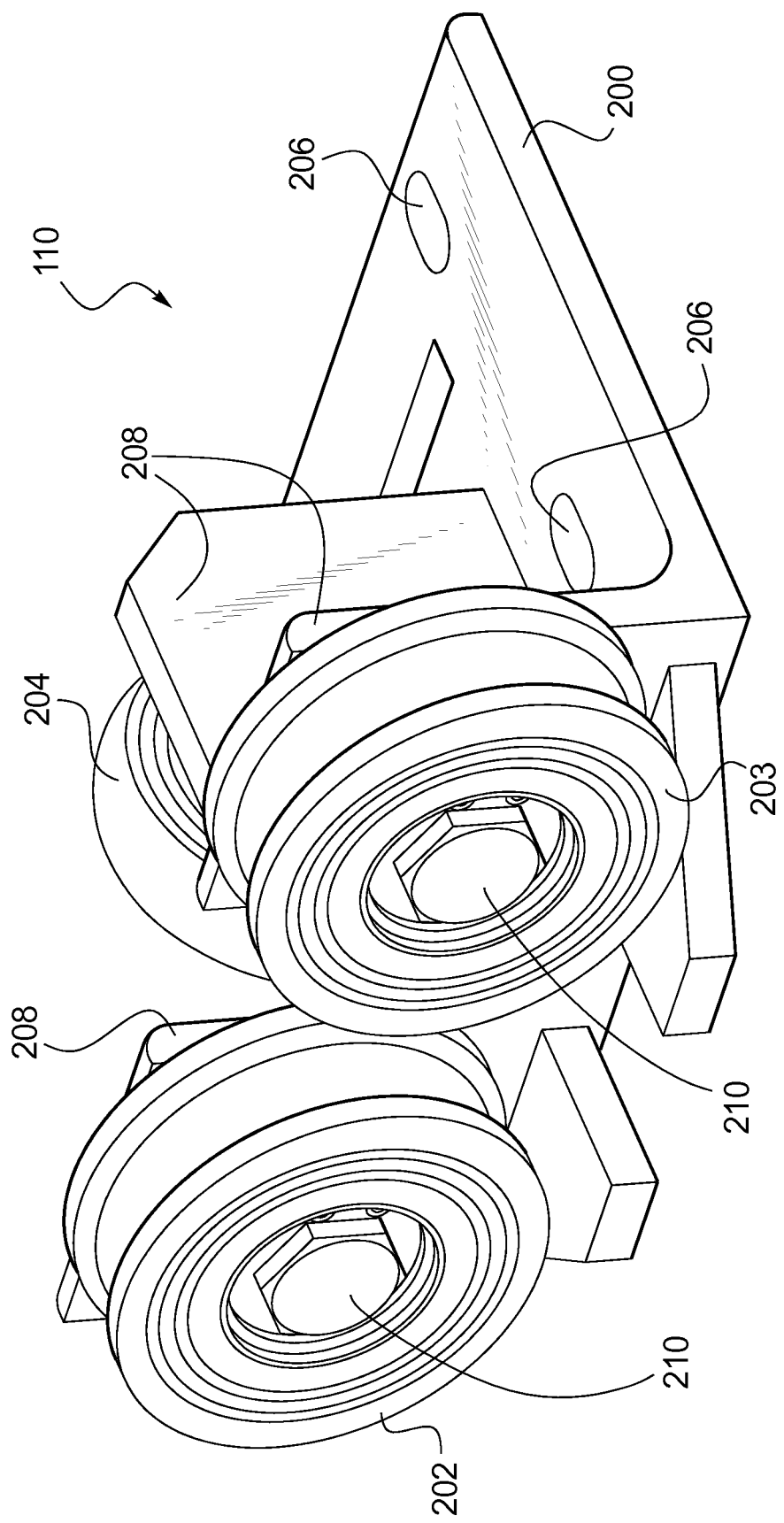
FIG. 3 illustrates a perspective view of one exemplary roller guide assembly.

Turning to FIG. 3, one exemplary roller guide assembly 110 that may be applied to the elevator system 100 of FIG. 2 is provided. As shown, the guide assembly 110 may include a baseplate 200 and a plurality of rollers 202-204. The baseplate 200 may include a plurality of apertures 206 through which the baseplate 200 may be rigidly mounted to elevator car frame 106 or car 108 using bolts, screws, and the like. The baseplate 200 may also provide a plurality of roller support members 208 each having a roller shaft 210 rigidly coupled thereto. Each roller 202-204 may be rotatably mounted about the roller shaft 210 and onto the corresponding support member 208. Moreover, the rollers 202-204 may be arranged to reduce any lateral travel of the elevator car 108 relative to the guiderails 112, and further, to dampen any vibrations between the rollers 202-204 and the guiderails 112. As shown in FIG. 3, for example, the guide assembly 110 may provide a first roller 202 and a second roller 203, each arranged in line with one another at an edge of the baseplate 200. Specifically, the first and second rollers 202, 203 may be configured to receive, in a rolling manner, one of the guiderails 112 therebetween and limit any front-to-back travel of the elevator car 108 relative to the guiderail 112. The guide assembly 110 may additionally provide a third roller 204 orthogonally arranged between the first and second rollers 202, 203. As with the first and second rollers 202, 203, the third roller 204 may be configured to receive, in a rolling manner, and abut an edge of the guiderail 112 so as to limit any side-to-side travel of the elevator car 108 relative to the guiderail 112.

Figure 4:
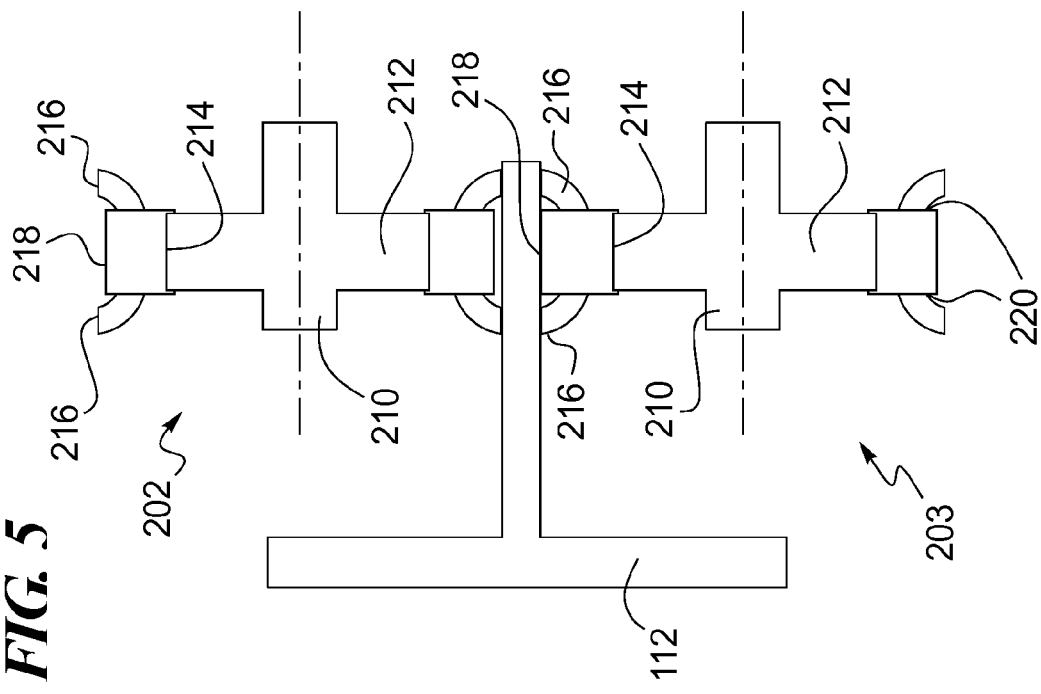
FIGS. 4-5 illustrate cross-sectional views of two exemplary front-to-back rollers.
Figure 5:
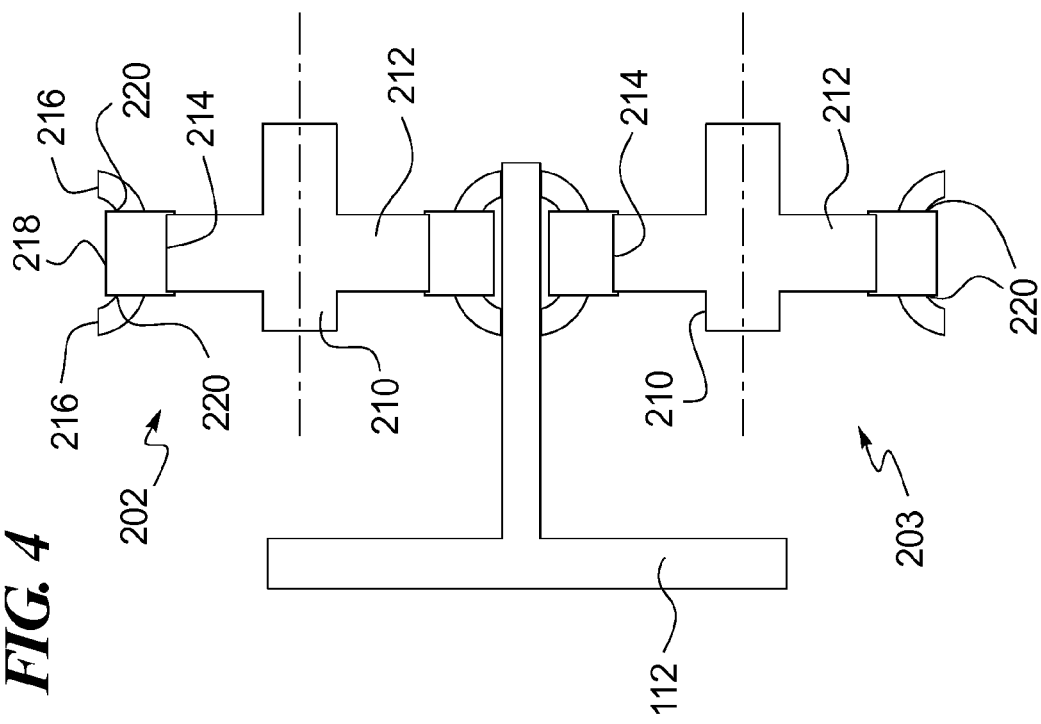

Referring now to FIGS. 4 and 5, one exemplary embodiment of the first and second rollers 202, 203 of FIG. 3 is provided. It is to be understood, however, the roller 202, 203 shown in FIGS. 4 and 5 could also be used as the third roller 204 of the roller guide assembly 110 shown in FIG. 3. As shown, each of the first and second rollers 202, 203 may include a bearing wheel 212 and a resilient member 214. Each bearing wheel 212 may interface with the roller shaft 210 using ball bearings, cylindrical bearings, or any other arrangement suited to reduce rotational friction between the roller 202, 203 and the roller shaft 210. The resilient member 214 may be radially fitted about the bearing wheel 212 and configured to malleably abut surfaces of the guiderail 112 thereagainst. The resilient member 214 may be formed of a rubber, a polytetrafluoroethane, a urethane, such as a polyether-based urethane, a polyester-based urethane, or any other resilient material designed to cause an increase in stiffness when making contact with the surfaces of the guiderail 112 and subjected to offset loads. Stiffness may be defined by the rate of change in load with respect to a change in deflection of the resilient material. In addition, the resilient members 214 may include geometries, such as ribs, lips, grooves, and the like, configured to exhibit a nonlinear or stepwise increase in stiffness while interfacing with the flat surfaces of the guiderails 112.

Still referring to FIGS. 4 and 5, each resilient member 214 may include at least a first section 216 of a first diameter and a second section 218 of a second diameter, each formed of a single resilient material. The first section 216 may be configured to deflect in response to loads having magnitudes that are within a first load range, and the second section 218 may be configured to deflect in response to loads having magnitudes that are within a second load range. In the exemplary embodiment of FIGS. 4 and 5, for example, the first section 216 of each roller 202, 203 may be greater in diameter than the second section 218. Accordingly, when the rollers 202, 203 are subjected to smaller loads having magnitudes that are within the first load range, the first section 216 of the rollers 202, 203 may provide adequate stiffness against the guiderail 112, as shown in FIG. 4. However, when the rollers 202, 203 are subjected to larger loads having magnitudes that exceed the first load range, or are within the second load range, deflection of the first section 216 and direct contact between the second section 218 and the guiderail 112 may be required for adequate stiffness. As shown in FIG. 5, for example, a load within the higher or second load range may fully deflect the first section 216 of the second roller 203 and place the second section 218 into direct contact with the guiderail 112. Correspondingly, higher offset loads may result in a stepwise increase in stiffness as the second section 218 of smaller diameter comes into direct contact with the guiderail 112. The resilient members 214 may additionally include geometries having one or more grooves 220 that are disposed between radially extending surfaces of the first and second portions 216, 218, i.e., the grooves 220 may be provided circumferentially about the rollers 202, 203. Furthermore, the depth, width and/or the number of grooves 220 provided on the resilient members 214 may be modified to adjust the stiffness exhibited by the rollers 202, 203. More specifically, the grooves 220 may be provided to reduce the stiffness exhibited by the rollers 202, 203.

Figure 6:
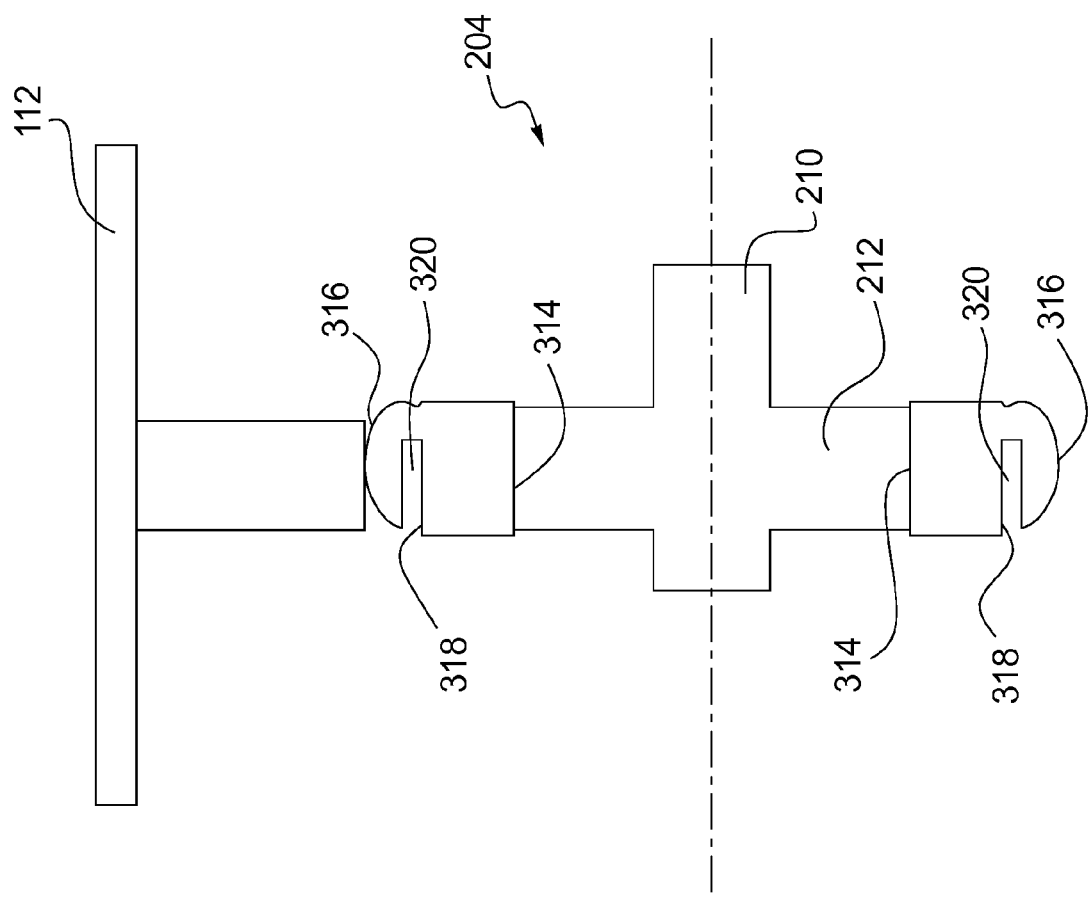
FIG. 6 illustrates a cross-sectional view of one exemplary side-to-side roller.

Turning to FIG. 6, one exemplary embodiment of the third roller 204 of FIG. 3 is provided. It is to be understood, however, the roller 204 shown in FIG. 6 could also be used as the first and second rollers 202, 203 of the roller guide assembly 110 shown in FIG. 3. As with the first and second rollers 202, 203 of the previous embodiment, the third roller 204 may include a bearing wheel 212 which reduces the rotational friction between the roller 204 and the corresponding roller shaft 210. The third roller 204 may also include a resilient member 314 that is radially fitted about the bearing wheel 212 and configured to malleably abut an edge of the guiderail 112 thereagainst as shown. As in the previous embodiments, the resilient member 314 may be formed of a single resilient material such as a rubber, a polytetrafluoroethane, a urethane, such as a polyether-based urethane, a polyester-based urethane, or any other resilient material designed to cause an increase in stiffness when making contact with the surfaces of the guiderail 112 and subjected to offset loads. Further, the resilient material may include a geometry which enables the roller 204 to exhibit a nonlinear increase in stiffness while interfacing with the guiderail 112. As shown in FIG. 6, for example, the resilient member 314 may include a first section 316 of a first or larger diameter and a second section 318 of a second or smaller diameter. Unlike previous embodiments, the first and second sections 316, 318 may be distinguished by a groove 320 which at least partially extends through one side of the resilient member 314. Like the previous embodiments, however, the grooves 320 may be provided to adjust (e.g., reduce) the stiffness exhibited by the rollers 202-204. The first section 316 may be configured to deflect in response to loads that are lower in magnitude, or within a first load range, and the second section 318 may be configured to deflect in response to loads that are greater in magnitude, or within a second load range. Accordingly, when the roller 204 is subjected to smaller loads having magnitudes that are within the first load range, the first section 316 may provide adequate stiffness to the guiderail 112. However, when the roller 204 is subjected to larger loads having magnitudes that exceed the first load range, both of the first and second sections 316, 318 may be used to provide a nonlinear increase in stiffness. More specifically, a nonlinear or stepwise increase in stiffness may occur when the guiderail 112 deflects the first section 316, substantially closes the groove 320 and at least partially causes some deflection of the second section 318. In alternative embodiments of the roller 204, the depth, width and/or the number of grooves 320 provided on the resilient member 314 may be modified to adjust the stiffness exhibited by the roller 204. In alternative modifications of the roller guide assembly 110, the third roller 204 may employ the resilient member 214 of the first and second rollers 202, 203 of FIGS. 4 and 5. In still further modifications of the guide assembly 110, the first and second rollers 202, 203 may employ the resilient member 314 of the third roller 204 of FIG. 6. Of course, in still further embodiments of the guide assembly 110, two or more of the rollers 202-204 may employ one of the resilient members 214, 314 whereas the third roller 202-204 may employ the other of the resilient members 214, 314.

Referring now to FIGS. 7-10, the deflective properties and the corresponding cross-sectional views of additional roller geometries are provided. Any one or more of the roller geometries shown in FIGS. 7-10 may be used as any of the rollers 202-204 shown in the embodiment disclosed in FIG. 3. As such, in some embodiments of the guide assembly 110, two or more of the rollers 202-204 may employ one of the roller geometries shown in FIGS. 7-10 whereas the third roller 202-204 may employ another of the roller geometries. In still further embodiments, all three of the rollers 202-204 in the guide assembly 110 may include the same roller geometries or different roller geometries. Finally, any one or more of the resilient members 414, 514, 614, 714 shown in FIGS. 7-10 may be formed of a material such as a rubber, a polytetrafluoroethane, a urethane, such as a polyether-based urethane, a polyester-based urethane, or any other resilient material designed to cause an increase in stiffness when making contact with the surfaces of the guiderail 112 and subjected to offset loads.

In the cross-sectional view of FIG. 7, the resilient member 414 may include a first section 416 of a greater diameter than a second section 418. The first and second sections 416, 418 may be further distinguished with by a set of grooves 420 disposed therebetween. In other words, the grooves 420 may be provided between radially extending surfaces of the first and second portions 416, 418, i.e., the grooves 420 may be provided circumferentially. Like the previous embodiments, the grooves 420 may be provided to adjust (e.g., reduce) the stiffness exhibited by the rollers 202-204. As compared with the stiffness of the prior art embodiment of FIG. 1, the resilient member 414 of FIG. 7 may provide a nonlinear increase in stiffness in response to an increase in load exerted thereon by a guiderail 112. More particularly, the resilient member 414 may exhibit different stiffness characteristics under different ranges of loads while in contact with a guiderail 112. For instance, the resilient member 414 may exhibit a first stiffness when the guiderail 112 interfaces with the first section 416 with loads that are within a first load range I. The resilient member 414 may also exhibit a second stiffness when the guiderail 112 interfaces with the second section 418 with generally greater loads that are within a second load range II that is greater than the first load range I. Accordingly, the resilient member 414 may exhibit a stepwise increase in stiffness once the applied load exceeds the first load range I, corresponding to deflection of the first section 416, and falls within the second load range II, corresponding to at least partial deflection of the second section 418.

The resilient member 514 of FIG. 8 may include a first section 516 of a first diameter, a second section 518 of a second diameter as well as a third section 519 of a third diameter being distinguished by two sets of grooves 520. In other words, the grooves 520 may be provided between radially extending surfaces of the first, second and third portions 516, 518, 519, i.e., the grooves 520 may be provided circumferentially. Like the previous embodiments, the grooves 520 may be provided to adjust (e.g., reduce) the stiffness exhibited by the rollers 202-204. Specifically, the first diameter may be greater than the second diameter, and the third diameter may be sized to be less than each of the first and second diameters. The resilient member 414 may exhibit different stiffness characteristics based on the magnitude of the load exerted thereon by the guiderail 112 and the particular section 516, 518, 519 that is making contact with the guiderail 112. Specifically, the resilient member 514 may exhibit a first stiffness when the guiderail 112 interfaces with the first section 516 with loads that are within a first load range I, exhibit a second stiffness when the guiderail 112 interfaces with the second section 518 with loads that are within a second load range II (that is greater than the first load range I), and further, exhibit a third stiffness when the guiderail 112 interfaces with the third section 519 with loads that are within a third load range III (that is greater than the second load range II). Accordingly, the resilient member 514 of FIG. 8 may exhibit a first stepwise increase in stiffness once the applied load exceeds the first load range I, corresponding to deflection of the first section 516, and falls within the second load range II, corresponding to at least partial deflection of the second section 518. The resilient member 514 may also exhibit a second stepwise increase in stiffness once the applied load exceeds the second load range II and falls within the third load range III, corresponding to at least partial deflection of the third section 519.

Similar to the embodiment of FIG. 6, the resilient member 614 of FIG. 9 may include a first section 616 of a greater diameter than a second section 618, wherein the first and second sections 616, 618 may be distinguished by a groove 620 partially extending through one side of the resilient member 614. Like previous embodiments, the grooves 520 may be provided to adjust (e.g., reduce) the stiffness exhibited by the rollers 202-204. As with previous embodiments, the resilient member 614 of FIG. 9 may also provide a nonlinear increase in stiffness with gradual increases in load, for example, as applied by a guiderail 112. More specifically, the resilient member 614 may exhibit a first stiffness when the guiderail 112 interfaces with the first section 616 with loads that are within a first load range I. The resilient member 614 may also exhibit a second stiffness when the guiderail 112 substantially closes the groove 620 and at least partially interfaces with the second section 618 with generally greater loads that are within a second load range II, which is greater than the first load range I. Accordingly, the resilient member 614 may exhibit a stepwise increase in stiffness once the applied load exceeds the first load range I, corresponding to deflection of the first section 616, and falls within the second load range II, corresponding to at least partial deflection of the second section 618 and substantial closure of the groove 620.

The resilient member 714 of FIG. 10 may include a first section 716 of a first diameter, a second section 718 of a second diameter as well as a third section 719 of a third diameter. Each of the first, second and third sections 716, 718, 719 may be distinguished by grooves 720 partially extending through one side of the resilient member 714. Like the previous embodiments, the grooves 720 may be provided to adjust (e.g., reduce) the stiffness exhibited by the rollers 202-204. The first diameter may be greater than each of the second and third diameters, and the third diameter may be sized to be less than each of the first and second diameters. The resilient member 714 of FIG. 10 may exhibit different stiffness characteristics under different load ranges of loads while in contact with a guiderail 112. For example, the resilient member 714 may exhibit a first stiffness when the guiderail 112 interfaces with the first section 716 with loads that are within a first load range I. The resilient member 714 may also exhibit a second stiffness when the guiderail 112 substantially closes the outermost groove 720 and at least partially interfaces with the second section 718 with generally greater loads that are within a second load range II, which is greater than the first load range I. The resilient member 714 of FIG. 10 may additionally exhibit a third stiffness when the guiderail 112 substantially closes both of the outermost and innermost grooves 720, and at least partially interfaces with the third section 719 with even greater loads that are within a third load range III, which is greater than the second load range II. Accordingly, the resilient member 714 may exhibit a first stepwise increase in stiffness once the applied load exceeds the first load range I, corresponding to deflection of the first section 716, and falls within the second load range II, corresponding to substantial closure of the first groove 720 and at least partial deflection of the second section 718. The resilient member 714 may further exhibit a second stepwise increase in stiffness once the applied load exceeds the second load range II and falls within the third load range III, corresponding to substantial closure of the second groove 720 and at least partial deflection of the third section 719.

Turning to FIGS. 11-13, still further alternative roller embodiments capable of exhibiting nonlinear stiffness are provided, any one or more of which may be used as any of the rollers 202-204 shown in the embodiment disclosed in FIG. 3. In the embodiments shown in FIGS. 11-13, it will be seen that the bearing wheels 812, 912, 1012 of the rollers 800, 900, 1000 may have asymmetric shapes across the radial interiors thereof. Such asymmetry may be provided to facilitate installation and fitment of the bearing wheel 212, 812, 912, 1012 onto, for example, a hub, or the like. More specifically, the bearing wheels 212, 812, 912, 1012 may include a shoulder for the bearing wheel 212, 812, 912, 1012 to stop on, when the bearing wheel 212, 812, 912, 1012 is fitted or pressed onto the associated hub. Moreover, the radial interior of the bearing wheels 212, 812, 912, 1012 may include a notch sized to receive a snap ring, or the like, that may be provided on an outer surface of the associated hub so as to retain the bearing wheel 212, 812, 912, 1012 thereagainst. Additionally, as with the previously disclosed resilient members 214, 314, 414, 514, 614, 714, any of the resilient members 814, 914, 1014 shown in FIGS. 11-13 may be made from a material such as a rubber, a polytetrafluoroethane, a urethane, such as a polyether-based urethane, a polyester-based urethane, or any other resilient material designed to cause an increase in stiffness when making contact with the surfaces of the guiderail 112 and subjected to offset loads.

Although the rollers shown in FIGS. 11-13 are numbered as 800, 900 and 1000, respectively, this renumbering is for ease of reference. It is to be readily understood that each of these rollers 800, 900, 1000 may be used as the rollers 202-204 of the roller guide assembly 110 shown in FIG. 3.

In the embodiment of FIG. 11, the roller 800 may essentially include a bearing wheel 812 and a resilient member 814 radially adhered and/or fitted thereabout. The resilient member 814 may include a first section 816 of a first diameter and a second section 818 of a second diameter, each formed of a single resilient material. As shown, the first diameter may be greater in diameter than the second diameter, and thus, the first section 816 may be caused to deflect in response to a first or lower load range while the second section 818 may be caused to deflect in response to a second or higher load range. The resilient member 814 may additionally include grooves 820 in proximity to the first section 816 and partially extending through the sides of the resilient member 814. In other words, the grooves 820 may extend axially. The side grooves 820 of FIG. 11 may serve to further reduce the stiffness of at least the first section 816 and lower the first load range. As in previous embodiments, the geometry provided in FIG. 11 may exhibit a nonlinear or stepwise increase in stiffness of the resilient member 814 as the magnitude of a load exceeds the first load range, corresponding to deflection of the first section 816, and falls within the second load range, corresponding to at least partial deflection of the second section 818.

The roller 900 of FIG. 12 may similarly include a bearing wheel 912 and a resilient member 914 provided thereabout. In contrast to the embodiment of FIG. 11, the bearing wheel 912 of FIG. 12 may provide a lip 921 onto which a notch 922 disposed on an inner surface of the resilient member 914 may be mated for a more secure fit. As in previous embodiments, the resilient member 914 may provide a first section 916 of a first diameter and a second section 918 of a second diameter, each formed of a single resilient material. Moreover, the first diameter may be greater in diameter than the second diameter, and thus, the first section 916 may be caused to deflect in response to a first or lower load range while the second section 918 may be caused to deflect in response to a second or higher load range. As shown in FIG. 12, the resilient member 914 may be provided without any grooves other than the recessed area distinguishing the first and second sections 916, 918 so as to provide more stiffness. Furthermore, the geometry of the first and second sections 916, 918 of the resilient member 914 shown may exhibit a nonlinear or stepwise increase in stiffness as the magnitude of a load placed thereon exceeds the first load range, corresponding to deflection of the first section 916, and falls within the second load range, corresponding to at least partial deflection of the second section 918.

Additionally, the roller 1000 of FIG. 13 may include a bearing wheel 1012 and a resilient member 1014 provided thereabout. In contrast to previous embodiments, the bearing wheel 1012 of FIG. 13 may provide a radial recess 1023 into which the resilient member 1014 may be fitted for a more support. The resilient member 1014 may provide first and second sections 1016, 1018 of unequal diameters, each formed of a single resilient material. The resilient member 1014 may also provide two grooves 1020 which further distinguish the first section 1016 from the second section 1018. In other words, the grooves 1020 may be provided between radially extending surfaces of the first and second sections 1016, 1018, i.e., the grooves 1020 may be provided circumferentially. Like the previous embodiments, the grooves 1020 may be provided to adjust (e.g., reduce) the stiffness exhibited by the rollers 202-204. As shown, the first section 1016 may be rounded and configured to have a minimum diameter that is less than the diameter of the second section 1018 as well as a maximum diameter that is greater than the diameter of the second section 1018. As the first section 1016 has a maximum diameter that is greater than that of the second section 1018, the first section 1016 may be caused to deflect in response to a first or a lower range of loads while the second section 1018 may be caused to deflect in response to a second or a higher range of loads. As with previous embodiments, the geometry of the first and second sections 1016, 1018 of the resilient member 1014 shown may exhibit a nonlinear or stepwise increase in stiffness as the magnitude of a load placed thereon exceeds the first load range, corresponding to at least partial deflection of the first section 1016, and falls within the second load range, corresponding to at least partial deflection of the second section 1018.

Referring now to FIGS. 14 and 15, yet another exemplary arrangement of rollers 1100 is provided. Any of the rollers 1100 shown may be used as any of the rollers 202-204 shown in the embodiment of FIG. 3, given that the associated guiderail 112 provides geometric features comparable to, for example, the protruded surfaces 115, disclosed in FIGS. 14 and 15. Correspondingly, any geometric feature comparable to, for example, the protruded surfaces 115 shown in FIGS. 14 and 15 may be provided to any of the guiderails 112 in the elevator system 100 disclosed in FIG. 2. Furthermore, as with the previously disclosed resilient members 214, 314, 414, 514, 614, 714, 814, 914, 1014, the resilient members 1114 of FIGS. 14 and 15 may be formed of a material such as a rubber, a polytetrafluoroethane, a urethane, such as a polyether-based urethane, a polyester-based urethane, or any other resilient material designed to cause an increase in stiffness when making contact with the surfaces of the guiderail 112 and subjected to offset loads.

Although the rollers shown in FIGS. 14 and 15 are numbered as 1100, this renumbering is for ease of reference. It is readily understood that the rollers 1100 may be used as the rollers 202-204 of the roller guide assembly 110 shown in FIG. 3.

As in previous embodiments, each of the rollers 1100 may include a bearing wheel 1112 that is rotatably mounted onto a roller shaft 1110 and a resilient member 1114 radially fitted about the bearing wheel 1112. The rollers 1100 may be arranged in line with one another so as to receive surfaces of a guiderail 112 therebetween and limit front-to-back travel of the elevator car 108 relative to the guiderail 112. More specifically, the resilient members 1114 of FIGS. 14 and 15 may include substantially flat outer surfaces which come into contact with the surfaces of the guiderail 112 under different offset loads. Furthermore, the surfaces of the guiderail 112 may include geometries which physically interact with the resilient members 1114 to exhibit a nonlinear or stepwise increase in stiffness in response to increasing offset loads. For example, each guiderail 112 may include at least one flat surface 113 and at least one protruded surface 115 substantially extending the length of the guiderail 112 and positioned to interface with the resilient members 1114. Alternatively, the guiderail 112 may include two or more protruded surfaces 115 of varying sizes. In other alternatives, the protruded surface 115 may include curved portions, rounded portions, angled portions, beveled portions, ribbed portions, ridged portions, or any combination thereof.

As shown in FIG. 14, lower offset loads may be sufficiently dampened by a first or a relatively lower stiffness that is exhibited as the resilient member 1114 pushes and/or rolls against only the protruded surface 115 of the guiderail 112. As shown in FIG. 15, higher offset loads may be sufficiently dampened by a second or a relatively greater stiffness that is exhibited as the resilient member 1114 deflects and pushes against the protruded surface 115 and at least a portion of the flat surface 113 of the guiderail 112. Moreover, as the magnitude of the offset load increases, the geometry of the interface between the rollers 110 and the guiderail 112 may be configured to cause a stepwise increase in the area of contact therebetween. As the area of contact between the resilient member 1114 and the guiderail 112 increases in a stepwise manner, the resulting stiffness may also increase in a stepwise manner. In alternative modifications, the embodiment of FIGS. 14 and 15 may additionally provide a third roller that is orthogonally arranged between the first and second rollers 1100 so as to receive an edge of the guiderail 112 and limit side-to-side travel of the associated elevator car 108. In still further modifications, the edge of the guiderail 112 may similarly include flat and protruded surfaces with which the third roller may contact under different offset loads and exhibit a stepwise increase in stiffness.

INDUSTRIAL APPLICABILITY

In light of the foregoing, it can be seen that the present disclosure sets forth an elevator system with novel roller and guide assemblies that improve overall ride quality in an elevator car with a more cost effective solution. Elevator cars are typically subjected to lower levels of lateral vibrations as well as higher offset loads which may cause undesirable contact between safety stops and the guiderails. The roller apparatus and roller guide assemblies of the present disclosure provides optimum stiffness over both lower and higher ranges of offset loads using a resilient member that is composed of only a single resilient material and no costly roller suspension components. The assemblies disclosed herein accomplish this by providing resilient members and guiderail surfaces with geometries which exhibit a nonlinear or stepwise increase in stiffness in response to an increase in load.

While only certain embodiments have been set forth, alternatives and modifications will be apparent from the above description to those skilled in the art. These and other alternatives are considered equivalents and within the scope of this disclosure.

What is claimed is:

1. A roller apparatus, comprising:
    a bearing wheel configured to rotatably couple the roller apparatus to a roller shaft; and
    a resilient member radially disposed about the bearing wheel and configured to contact a guiderail at different magnitudes of loads, the resilient member including a first section of a first diameter and a second section of a second diameter, the first section being caused to deflect in response to loads within a first load range, the second section being caused to deflect in response to loads within a second load range, the resilient member configured to exhibit a stepwise increase in stiffness with a gradual increase in load, the first diameter being greater than the second diameter, the first section including at least two separate, radially extended surfaces and the second section disposed between the at least two separate, radially extended surfaces, wherein the second section comes in direct contact with the guiderail upon the stepwise increase in stiffness.

2. The roller apparatus of claim 1, wherein each of the first section and the second section of the resilient member is formed of a single resilient material.

3. The roller apparatus of claim 1, wherein the second load range is greater in magnitude than the first load range, the stepwise increase in stiffness occurring when the load exceeds the first load range.

4. The roller apparatus of claim 3, wherein the stepwise increase in stiffness occurs when the first section deflects and the second section makes contact with the guiderail.

5. The roller apparatus of claim 1, wherein the resilient member includes at least one groove distinguishing the first section from the second section, the groove being configured to reduce the stiffness of at least one of the first section and the second section.

6. The roller apparatus of claim 5, wherein the groove is disposed at a side of the resilient member such that the first section is radially distinguished from the second section, the stepwise increase in stiffness occurring when the load exceeds the first load range and causes the groove to be substantially closed.

7. The roller apparatus of claim 1, wherein the resilient member further includes a third section of a third diameter being caused to deflect in response to loads within a third load range, the third diameter being less than each of the first and second diameters, the third load range being greater in magnitude than each of the first and second load ranges.

8. A guide assembly, comprising:
a baseplate having a plurality of roller shafts rigidly coupled thereto; and
a plurality of rollers rotatably coupled to the roller shafts, each roller including a resilient member being configured to contact a guiderail at different magnitudes of loads, and having a first section of a first diameter and a second section of a second diameter, the resilient member configured to exhibit a stepwise increase in stiffness with a gradual increase in load, the first diameter being greater than the second diameter, the first section including at least two separate, radially extended surfaces and the second section disposed between the at least two separate, radially extended surfaces, wherein the second section comes in direct contact with the guiderail upon the stepwise increase in stiffness.

9. The guide assembly of claim 8, wherein the first section is caused to deflect in response to loads within a first load range and the second section is caused to deflect in response to loads within a second load range, the first diameter being greater than the second diameter and the second load range being greater in magnitude than the first load range.

10. The guide assembly of claim 8, wherein each of the first section and the second section of the resilient member is formed of a single resilient material.

11. The guide assembly of claim 8, wherein the resilient member includes at least one groove distinguishing the first section from the second section, the groove being configured to reduce the stiffness of at least one of the first section and the second section.

12. The guide assembly of claim 8, wherein the plurality of rollers includes a first roller, a second roller and a third roller, the first roller and the second roller being aligned with one another at an edge of the baseplate so as to receive opposing surfaces of the guiderail therebetween, the third roller being orthogonally positioned between the first roller and the second roller so as to receive an edge of the guiderail thereagainst.

13. The guide assembly of claim 12, wherein the resilient member of the third roller includes at least one groove disposed at a side thereof such that the first section is radially distinguished from the second section.

14. An elevator system, comprising:
two or more guiderails vertically disposed within a hoistway;
an elevator car movably disposed between the guiderails; and
a plurality of guide assemblies disposed between the elevator car and the guiderails, each guide assembly including a baseplate rigidly coupled to the elevator car, and a plurality of rollers rotatably coupled to the baseplate, each roller including a resilient member being configured to contact the guiderails at different magnitudes of loads, and having a first section of a first diameter and a second section of a second diameter, the resilient member configured to exhibit a stepwise increase in stiffness with a gradual increase in load, the first diameter being greater than the second diameter, the first section including at least two separate, radially extended surfaces and the second section disposed between the at least two separate, radially extended surfaces, wherein the second section comes in direct contact with the guiderail upon the stepwise increase in stiffness.

15. The elevator system of claim 14, wherein each guiderail includes at least one flat surface and at least one protruded surface substantially extending the length of the guiderail and configured to interface with at least one of the resilient members, the resilient members being configured to exhibit a first stiffness in response to loads within a first load range while contacting the protruded surface and exhibit a second stiffness in response to loads within a second load range while contacting both the flat surface and the protruded surface, the second load range being greater in magnitude than the first load range.

16. The elevator system of claim 14, wherein the first section being caused to deflect in response to loads within a first load range, and the second section being caused to deflect in response to loads within a second load range, and the second load range being greater in magnitude than the first load range.

17. The elevator system of claim 14, wherein the plurality of rollers includes at least two front-to-back rollers aligned with one another at an edge of the baseplate so as to receive opposing surfaces of the guiderail therebetween and limit front-to-back movement of the elevator car.

18. The elevator system of claim 17, wherein the plurality of rollers includes at least one side-to-side roller orthogonally positioned between the front-to-back rollers so as to receive an edge of the guiderail thereagainst and limit side-to-side movement of the elevator car.

* * * * *